Patented Feb. 2, 1926.

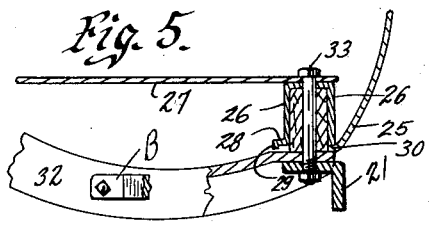
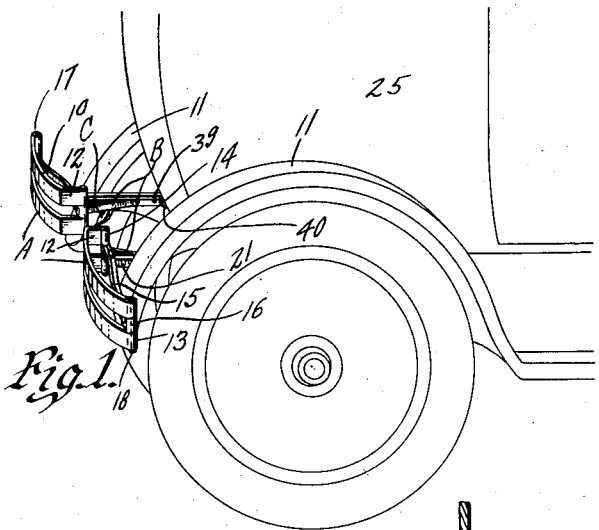
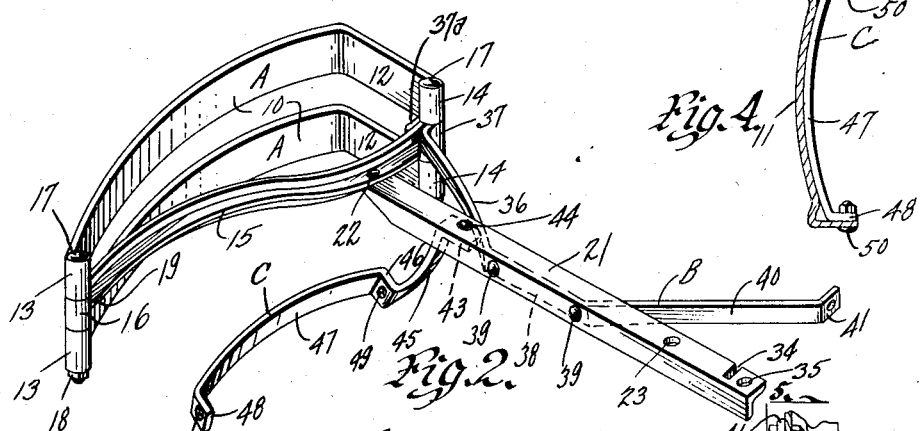
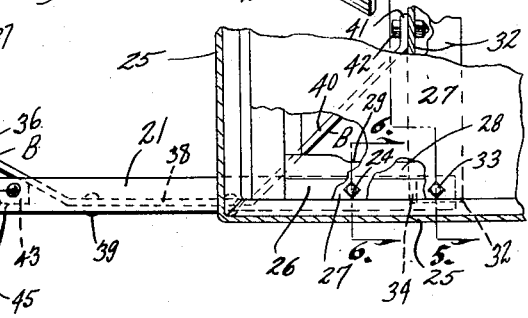

1,571,885

UNITED STATES PATENT OFFICE.

ALGOT W. NORDGREN, OF ST. PAUL, MINNESOTA, ASSIGNOR TO MARQUETTE MANUFACTURING COMPANY, OF ST. PAUL, MINNESOTA.

TWIN BUMPER STRUCTURE.

Application filed October 26, 1925. Serial No. 64,913.

*To all whom it may concern:*

Be it known that I, ALGOT W. NORDGREN, a citizen of the United States, and a resident of St. Paul, in the county of Ramsey and State of Minnesota, have invented a certain new and useful Twin Bumper Structure, of which the following is a specification.

It is the object of my invention to provide a twin bumper structure comprising bumper units adapted to be mounted on a motor vehicle body or the like at one end thereof and at opposite sides of such body.

A further object is to provide a twin bumper structure comprising two independent units to serve as right and left-hand bumpers and to provide a novel and effective means for conveniently and rigidly mounting said units on the body of a car.

With these and other objects in view, my invention consists in the construction, arrangement, and combination of the various parts of my twin bumper structure, whereby the objects contemplated are attained, as hereinafter more fully set forth, pointed out in my claims, and illustrated in the accompanying drawings, in which:

Figure 1 shows a perspective view of the rear of an automobile equipped with a bumper structure embodying my invention.

Figure 2 is a perspective view of one of the bumper units.

Figure 3 shows a top or plan view of one of the bumper units installed on the car body, the car body being shown partly in section and with parts broken away.

Figure 4 is a horizontal, sectional view of the rear end of the fender showing a portion of the bumper unit attached thereto.

Figure 5 is a detail, sectional view taken on the line 5—5 of Figure 3; and

Figure 6 is a detail, sectional view taken on the line 6—6 of Figure 3.

My improved bumper structure comprises a pair of units adapted to be mounted preferably at the rear of the car at the opposite sides thereof. These units are alike with the exception that they are made in rights and lefts, and I will now describe the right-hand unit with the understanding that the left-hand unit is the same with the necessary changes to adapt it for use on the left-hand side of the car.

My improved bumper structure comprises a pair of spring steel bumper members indicated in the accompanying drawings by the reference character A.

Each bumper member A comprises a curved member indicated by the reference numeral 10.

Describing the device as adapted to the rear of the car, it will be noted that the concave face of the member 10 is forward and is of such length that it extends from a point spaced outwardly from the fender 11 laterally to a point spaced inwardly therefrom and stands behind the fender far enough to make the proper installation of the device.

At its inner end, each spring bumper element A has a portion 12 inclined forwardly with relation to the car, as shown in Figure 3.

The bumper members A are arranged in vertically spaced position with relation to each other.

At the ends of the bumper members A, the material thereof is bent to form eyes 13 at what may be called the outer ends of said members and eyes 14 at their inner ends.

The eyes 13 and 14 of the upper bumper member A are vertically aligned with the eyes 13 and 14 respectively of the lower bumper member A.

A rigid T-iron member 15 has an eye 16 formed at its outer end and arranged in alignment with the respective eyes 13. A bolt or spindle 17 is extended through the eyes 13 and the eye 16, as shown for instance in Figure 2, and has a nut 18 on its lower end.

A similar bolt 17 is extended through the eyes 14 and has a similar nut on its lower end.

The other end of the member 15 stands adjacent to the latter bolt 17 and is secured thereto in the manner later referred to.

The rigid T-iron 15 is preferably formed with a reverse curve, as shown in Figures 2 and 3, so that that portion thereof standing directly behind the fender is somewhat curved around the rear end of the fender, as shown in Figure 3.

The horizontal flange of the rigid T-iron member 15 is cut off with a beveled face at its ends as illustrated at 19 and 20 in Figure 3.

An angle iron support 21 has its rearward end bolted or riveted as at 22 to the horizontal flange of the T 15.

As installed, the angle iron support 21 extends forwardly beneath the body of the car. Near its forward end, the angle iron support 21 is provided in its upper, horizontal flange with a hole 23 adapted to receive the lower end of a body bolt 24, as shown in Figure 6.

The automobile body 25 may have the fore-and-aft channel frame member 26 downwardly opening, as shown in Figure 6, and supporting the floor 27 of the body.

On the present Ford car, the channel frame member 26 has on the inside of its lower edge a laterally extending flange 28 terminating in a downwardly extending flange 29, as shown in Figure 6.

The body 25 has at its side a flange 30 extending under the outer flange of the channel 26. (See Figure 6.)

The upper horizontal flange of the angle support 21 rests just below the channel frame member 26.

The body bottom or floor 27 rests on the channel 26 and is secured thereto by the bolt 24 already referred to.

In installing my improved bumper structure, the nut 31 on the lower end of the bolt 24 is removed and the bolt 24 is extended through the hole 23 in the angle 21, and the nut 31 is then replaced in its original position.

It happens that with the Ford car now being put out, the upper horizontal flange of the angle 21 snugly fits against the central member of the channel frame member 32 where attached by the bolt 33 and against the flange 28 of the frame member 26 where attached by the bolt 24.

In the present Ford construction, there is a cross channel frame member 32, which extends laterally and has its ends resting just beneath the channel 26, as shown in Figure 5.

The channels 26 and 32 are connected by a bolt 33, which extends through the floor 27, the top of the channel 26 and the top of the channel 32.

The angle 21 extends forwardly beyond the hole 23 and is provided near its forward end in its upper, horizontal flange with a notch 34 to receive the rearward, vertical flange of the cross channel frame member 32 and with a hole 35 to receive the bolt 33.

It will thus be seen that the angle bar support 21 is fastened to the main side channel frame member 26 of the vehicle body by means of the body bolts 24 and 33 already provided on the present type of Fords.

It will, of course, be understood that it is within the scope of my invention to fasten the angle bar 21 to the frame of the car by other bolts.

I prefer to support it by means of the bolts 24 and 33 because they are already in such places on the car as to afford proper attachment and by using the bolts 24 and 33 the expense of additional bolts is saved.

Furthermore by using the regular body bolts for attaching the support 21, it is made possible to utilize the cross frame channel 32 for assisting in holding the support 21 in place against certain strains, by providing the notch 34 in the support 21 to receive the end of one of the flanges of the channel 32.

In order to further rigidly support the bumper structure and the member 21 against twisting and lateral strains, I provide a special brace indicated generally by the reference character B, which comprises a portion 36 having an eye 37, as shown for instance in Figure 2, formed to receive the inner bolt 17. The eye 37 has an extension 37ª (Figure 3), fastened to the inner end of the T-iron member 15.

It will be noted that the support 21 is fastened to the T-iron member 15 outwardly and laterally from the inner bolt 17.

The portion 36 of the brace B is inclined from the eye 37 forwardly and outwardly to a point below the upper horizontal flange of the angle 21 adjacent to the vertical flange thereof.

Extending then forwardly from the portion 36 is a portion 38 of the brace B, which is adjacent to and parallel with the vertical flange of the angle 21 and bolted thereto as at 39.

From the forward end of the portion 38 of the brace B, a third portion 40 of said brace is inclined forwardly and inwardly, as shown for instance in Figures 2 and 3, and terminates in the laterally projecting end 41, which rests against the rear flange of the cross channel frame member 32, as shown in Figure 3 and also as illustrated in Figure 5.

A bolt 42 is extended through the end member 41 of the portion 40 of the brace B and through the rear flange of the cross channel frame member 32, as shown in Figure 3.

The brace member B thus serves to rigidly connect the T-iron member 15 of the bumper with the support 21 and with the cross channel member 32 of the car frame and resists twisting and lateral strains on the bumper, as well as fore-and-aft blows or strains thereof.

I preferably use in connection with the structure already described, a fender brace indicated generally by the reference character C, comprising a piece of heavy strap iron.

The fender brace C has at its inner end a portion, which when the parts are assembled, is horizontal, as indicated at 43 in dotted lines in Figure 2. The portion 43 is fastened by a bolt 44 to the under side of the horizontal flange of the support 21.

The strap iron brace C is bent downwardly and laterally as indicated at 45 away from the rear part of the portion 43 and then has a portion 46 bent rearwardly to fit inside the inner flange of the rear part of the fender.

A portion 47 extends laterally from the portion 46 and is curved to fit the inside of the main body of the rear end of the fender and terminates in a forwardly projecting end 48 adapted to fit against the inside of the outer flange of the fender.

The portions 46 and 48 are provided with holes 49 to receive bolts 50 by which they are fastened to the flanges of the fender 11, as shown in Figure 4.

It is my ordinary practice to build the fender structure as a unit in the factory and to assemble its parts as shown in Figure 2 for purposes of storage and shipment. The unit is then ready for installation on the car.

The left-hand unit is the same as the one shown in Figure 2, with the changes necessary to adapt it for use on the left-hand side of the car.

By making the units separate as shown here instead of connecting them by a cross bar of some kind, a pair of units, to-wit, a right and a left, may be packed in a small space for storage and shipment.

Less material is used and less space is required for storage than would be the case if the units were connected by a cross bar.

At the same time, a strong and rigid connection which will withstand all ordinary blows is provided.

A bumper structure of this kind is fully as strong as one having the connecting cross bar between the units.

When the device is to be installed on the car, the nuts on the bolts 24 and 33 are removed and the bumper unit is fitted into place with said bolts extended through the holes 23 and 35. The nuts are then replaced on the bolts 24 and 33. The bolt 45 is placed in position for fastening the brace B to the cross channel bar frame member.

It will be understood that holes will have been cut in the proper places of the flanges of the fender 11, so that the bolts 50 can be inserted for fastening the fender brace C in place.

There is thus provided a brace for the rearwardly projecting ends of the fenders by which such fenders are rigidly supported on the body of the car at their rearward ends, where they are most subject to shock and vibration.

The members 10 are long enough so that they protect the rear ends of the fenders thoroughly as shown in Figures 1 and 3.

Ample room is left between the right and left-hand units for the spare tire.

Some changes may be made in the details of the structure and arrangement of the parts of my improved twin bumper structure without departing from the real spirit and purpose of my invention, and it is my intention to cover by my claims, any modified forms of structure or use of mechanical equivalents, which may be reasonably included within their scope.

I claim as my invention:

1. In a device of the class described, a spring bumper element adapted when installed to stand spaced from the end of a fender, a rigid member connecting the ends of said bumper element, a rigid support connected with said rigid member between its ends and extending away therefrom at substantially a right angle thereto, means for fastening said rigid support rigidly to the body of a car, and a brace rigidly connected with the inner portion of said rigid member and inclined therefrom laterally and forwardly to said support, then having a portion extending parallel to said support and fastened thereto, and a portion extending forwardly and inwardly from said parallel portion and adapted to be fastened to the frame of a car.

2. In a device of the class described, a bumper adapted when installed to be spaced from the end of a fender for protecting it, and means for supporting said bumper on a car body comprising a rigid support, means for fastening said rigid support rigidly to the body of a car, and a brace rigidly connected with the inner portion of said bumper and inclined therefrom laterally and forwardly to said support, then having a portion extending parallel to said support and fastened thereto, and a portion extending forwardly and inwardly from said parallel portion and adapted to be fastened to the frame of a car.

3. In a device of the class described, a pair of vertically spaced curved bumper elements adapted when installed to stand spaced from and across the end of a fender, a rigid member connecting the ends of said bumper elements, a rigid support connected with said rigid member between its ends and extending away therefrom at substantially a right angle thereto, means for fastening said rigid support rigidly to the body of a car, and a brace rigidly connected with the inner portion of said rigid member and inclined therefrom laterally and forwardly to said support, then having a portion extending parallel to said support and fastened thereto, and a portion extending forwardly and inwardly from said parallel portion and adapted to be fastened to the frame of a car.

4. In a device of the class described, the combination of a car having a longitudinal frame member and a transverse frame member with a bumper support arranged with a portion of its length adjacent to and parallel with said longitudinal frame member, a bolt connecting said frame member and said bumper support, said transverse frame member having a flange, said bumper support having a notch receiving said flange, a second bolt on the opposite side of said notch from said first bolt connecting said support and said longitudinal frame member, and a brace secured to said transverse frame member and inclined diagonally to said bumper support and secured thereto at a point spaced from said bolts.

5. In a device of the class described, the combination of a car having a longitudinal frame member and a transverse frame member with a bumper support arranged with a portion of its length adjacent to and parallel with said longitudinal frame member, a bolt connecting said frame member and said bumper support, said transverse frame member having a flange, said bumper support having a notch receiving said flange, a second bolt on the opposite side of said notch from said first bolt connecting said support and said longitudinal frame member, and a brace secured to said transverse frame member and inclined diagonally to said bumper support and secured thereto at a point spaced from said bolts, a bumper secured at a point between its ends to said support, said brace having a portion inclined away from said support and secured to said bumper at a point spaced from the support.

Des Moines, Iowa, October 23, 1925.

ALGOT W. NORDGREN.